Figure 1:
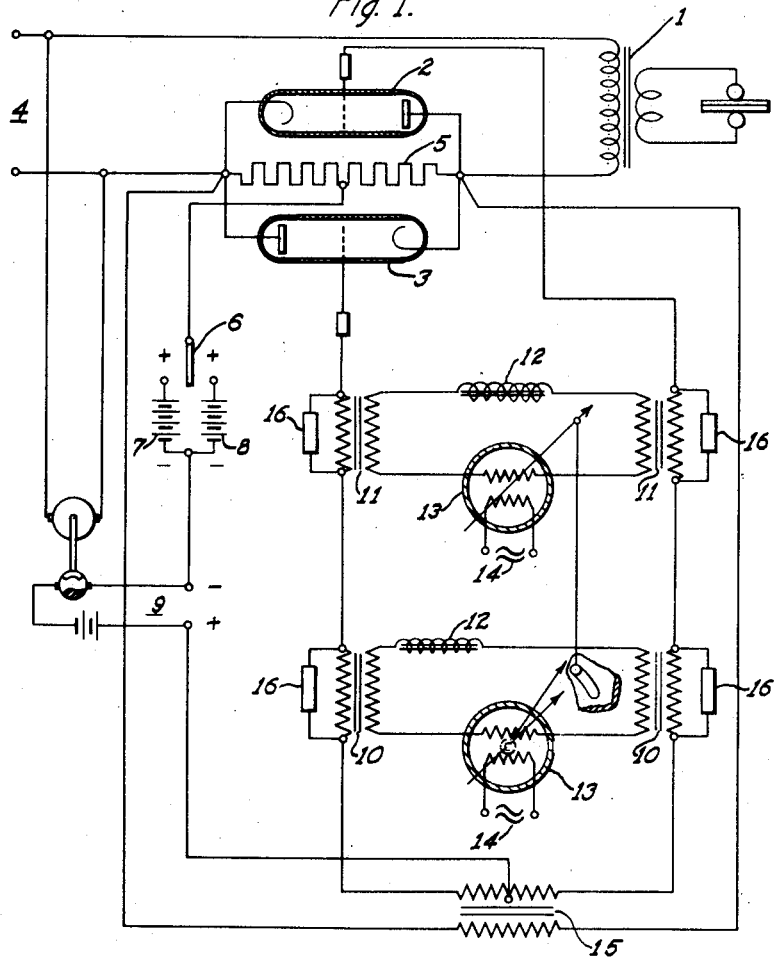

Oct. 10, 1939.  R. SCHNARZ  2,175,921

WELDING SYSTEM

Filed Nov. 12, 1937

WITNESSES:
Leon M. Garman
Hymen Diamond

INVENTOR
Richard Schnarz.
BY
F. W. Lyle.
ATTORNEY

Patented Oct. 10, 1939

2,175,921

UNITED STATES PATENT OFFICE 2,175,921

WELDING SYSTEM

Richard Schnarz, Berlin-Siemensstadt, Germany, assignor to Westinghouse Electric & Manufacturing Company, East Pittsburgh, Pa., a corporation of Pennsylvania Application November 12, 1937, Serial No. 174,193
In Germany February 5, 1937

12 Claims. (Cl. 219—4)

Arrangements for electric seam welding are known in which the welding circuit is periodically opened and closed by means of controllable gas or vapor discharge paths. The discharge paths are, in this arrangement, customarily connected in anti-parallel and lie between the primary winding of the welding transformer and the alternating current network. A control device connected to the control electrodes of the discharge paths conducts to the control electrodes positive or negative potential and in this manner releases or blocks the current passage through the discharge paths. By varying the degree of control of the controlled discharge paths by means of the control device, the magnitude of the current flowing in a welding period may be regulated. To attain flawless welded seams, particularly welded seams which manifest the least possible impression, it has appeared advantageous to permit a current to flow also during the pauses between welding impulses and in accordance with the requirements of the operation to regulate it in fine steps, or better still, continuously.

According to the invention, the control potential of the discharge paths is composed of a plurality of components, each of which is regulable in itself; the components are so dimensioned that while maintaining the desired ratios of the times during which welding current and pause current flows, a stepless regulation of the welding current and the pause current independently of each other is made possible. A particularly simple and advantageous embodiment of the invention consists in an arrangement in which one of the regulating components of the control potential has, as far as possible, a rectangular form as a function of time and the other two have a peaked form. The rectangular shaped potential and also one of the peaked potentials, are smaller in valve than the blocking potential. However they are so selected that their sum exceeds the value of the blocking potential. The second potential peak on the other hand is so dimensioned that it is larger than the negative blocking potential. The rectangular shaped potential taken by itself serves to establish the time ratio of the working current to the pause current and taken together with the first-named potential peak serves to provide stepless regulation of the welding current. The second potential peak serves to provide a stepless regulation of the pause current. The first potential peak determines the ignition point of the operating current, the second the ignition point of the pause current. Both potential peaks are variable in phase independently of each other; however, their relative phase position is so adjusted that the smaller potential peaks lead the larger potential peaks. Only by maintaining this condition, the smaller potential peak alone determines the ignition point and the degree of control of the operating current, and the regulation of the operating current and the pause current takes place independently. In addition, provisions may be made for connecting in a second blocking potential smaller than the rectangular shaped potential. In such a case, there results the highly desirable condition during operation of the stepless exclusive regulation of the pause current independently of the operating current.

Figure 2:
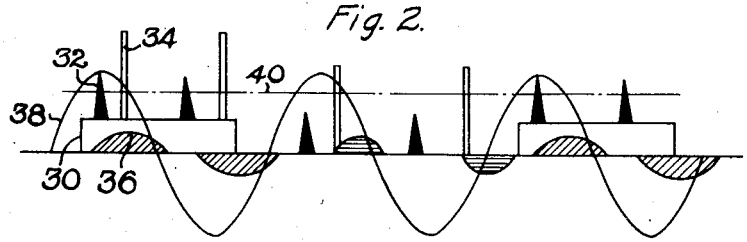

Fig. 1 is a diagrammatic view showing a preferred embodiment of my invention, and Fig. 2 is a graph illustrating the operation of Fig. 1.

In Figure 1, the circuit of a seam welding arrangement is illustrated as an exemplary embodiment of the invention; in this circuit, the welding transformer 1 is connected to an alternating current network 4 through two grid controlled anti-parallel connected mercury vapor discharge vessels 2 and 3. The two discharge vessels 2 and 3 are interconnected by the reference resistor 5. In the grid circuit of the two discharge vessels, one or the other of the two direct current sources 7 and 8 may be selectively connected through the switch 6 for supplying a blocking potential of larger or smaller magnitude. The magnitude of the two potentials 7 and 8 is, in this case, so selected that one is smaller than the rectangular shaped potential supplied by the control source 9 (curve 30, Fig. 2) and the other is larger than the rectangular potential and smaller than the sum of 9 and the potential peaks produced on the secondary side of the transformers 10 and 11 (curves 32 and 34, Fig. 2, respectively). The control potential source 9, which is also connected in the grid circuits of the two discharge vessels, and which is not shown more in detail, supplies, in periodic sequences, approximately rectangular shaped positive potential impulses. As a potential source, one of the known timing circuits may be utilized; it may, for example, also operate with controllable gas or vapor discharge paths. The positive potential impulses 30 supplied by the potential source 9 is suitably impressed on the negative blocking potential supplied by one of the potential sources 7 and 8; further, the grid circuits of the two discharge vessels 2 and 3 contain the grid transformers 10 and 11, which supply on the resistors 16 potential peaks 32 and 34 of different height and of regulable phase position. To produce the potential peaks regulable in their phase, each of the transformers 10 and 11 is connected on the other side with a supersaturated iron choke 12 and through a phase rotator 13 with an alternating current source 14. The diverse heights of the potentials delivered by the alternating current sources are here selected to correspond to the above-named operating requirements. To produce the potential peaks 32 and 34 controllable in their phase position, other known impulse control circuits may be utilized, as, for example, the magnetic impulse controlled device which operates with highly saturated three-winding transformers. In this case, one winding is supplied with direct current, the second with alternating current, from the third the potential peaks are derived. The phase rotators 13 are coupled with each other by a drag arrangement not shown more in detail, for example, a pointer rotatable about an end point which carries along with it an adjusting button in a circular shaped groove in such manner that the smaller potential peaks 32 always lead the larger peaks 34 in phase. Finally, there is connected in the grid circuits of the two discharge vessels 2 and 3, a compensation transformer 15 which is in known manner connected to the reference resistor 5.

The manner of operation of the invention will be seen from the curve of Figure 2. The currents flowing in the welding circuit are illustrated shaded under curves 36 to distinguish them from the anode potentials 38 and the control potentials 30, 32 and 34. The dot-dash line 40 gives the course of the negative blocking potential. From Fig. 2, it can be clearly seen that the rectangular shaped potential impulses 30 determine the connecting ratios of the operating current and the pause current, that the small potential peaks 32, together with the rectangular impulses 30, continuously control the operating current, and that the large potential peaks 34 continuously control the pause current. It is also easily seen from Fig. 2 that the control of the operating current and the pause current takes place independently and without influencing the connecting of the operating current and the pause current.

Another embodiment of the invention consists in the selection as components of the control potential, one which is essentially positive during the operating period to determine the time ratio of the operating current and the pause current, a rectangular potential and a potential of peaked wave form. The potential which is essentially positive during the operating period and the potential of rectangular wave form are so dimensioned that the first is smaller than the negative blocking potential and their sum is larger than the negative blocking potential. The height of the potential peak is to be so selected that it, together with the rectangular shaped potential exceeds the negative blocking potential. The potential of rectangular wave form must lead the potential of peaked wave form in phase if an independent regulation of the operating current and the pause current is to be attained.

I claim as my invention:

1. Device for electrical seam spot welding with the aid of controllable gas or vapor discharge paths, preferably grid controlled mercury vapor discharge paths, in which the operating current, as well as the pause current, is continuously regulated, characterized by means for supplying control potential to the discharge paths which is composed of a plurality of components and means for regulating each of the components for itself, said regulating means being so set that the connecting ratio of the operating current and the pause current is maintained and the regulating means associated with certain of said components including means functioning to vary said components continuously so that a continuous regulation of the operating current and the pause current, independently of each other, is possible.

2. Device according to claim 1, characterized by the fact that for the control of the discharge paths, in addition to a negative blocking potential, a potential essentially positive over the period of the operating current and two potentials of peaked wave form but of different height superimposed on this potential are utilized; the smaller of the peaked potentials leading the larger in phase and, together with the periodic positive potential, determining the ignition point of the operating current while the other determines the ignition point of the pause current.

3. Device according to claim 1, characterized by the fact that for the control of the discharge paths, in addition to a negative blocking potential, a potential essentially positive over the period of the operating current and two potentials of peaked wave form but of different height superimposed on this potential are utilized; the smaller of the peaked potentials leading the larger in phase and, together with the periodic positive potential, determining the ignition point of the operating current while the other determines the ignition point of the pause current, said peaked wave form potential components being supplied through phase rotating devices and the difference in phase between said components being effected by a drag device which couples the phase rotating device of the smaller component with that of the larger.

4. Apparatus for supplying energy from a source of periodically pulsating current to weld materials comprising gaseous electric discharge means, having a plurality of principal electrodes and control means for the discharge between said principal electrodes, in circuit with said source and said materials, means for impressing a potential less than the critical potential of said discharge path on said control means during the number of successive pulsations of said source that the welding current is to flow, said potential being impressed intermittently, a number of successive pulsations of said source, during which welding current is not to flow, intervening between successive impressions of said potential, means for superimposing on said impressed potential during each pulsation of said source, a potential of peaked wave form, the sum of the amplitude of the potential of peaked wave form and the amplitude of the said impressed potential being greater than said critical potential, and means for superimposing on the last said potentials during each pulsation of said source another potential of peaked wave form the amplitude of which is greater than the said critical potential.

5. Apparatus for supplying energy from a source of periodically pulsating current to weld materials comprising gaseous electric discharge means, having a plurality of principal electrodes and control means for the discharge between said principal electrodes, in circuit with said source and said materials, means for impressing a potential less than the critical potential of said discharge path on said control means during the number of successive pulsations of said source that the welding current is to flow, said potential being impressed intermittently, a number of successive pulsations of said source, during which welding current is not to flow, intervening between successive impressions of said potential, means for superimposing on said impressed potential during each pulsation of said source, a potential of peaked wave form, the amplitude of said potential of peaked wave form also being smaller than said critical potential and the sum of the amplitude of the potential of peaked wave form and the amplitude of the said impressed potential being greater than said critical potential, and means for superimposing on the last said potentials during each pulsation of said source another potential of peaked wave form the amplitude of which is greater than the said critical potential.

6. Apparatus for supplying energy from a source of periodically pulsating current to weld materials comprising gaseous electric discharge means, having a plurality of principal electrodes and control means for the discharge between said principal electrodes, in circuit with said source and said materials, means for impressing a potential less than the critical potential of said discharge path on said control means during the number of successive pulsations of said source that the welding current is to flow, said potential being impressed intermittently, a number of successive pulsations of said source, during which welding current is not to flow, intervening between successive impressions of said potential, means for superimposing on said impressed potential during each pulsation of said source, a potential of peaked wave form, the amplitude of said potential of peaked wave form also being smaller than said critical potential and the sum of the amplitude of the potential of peaked wave form and the amplitude of the said impressed potential being greater than said critical potential, means for superimposing on the last said potentials during each pulsation of said source another potential of peaked wave form the amplitude of which is greater than the said critical potential and means for so adjusting the phases of the said potentials of peaked wave form that the first-named potential of peaked wave form leads the last-named potential of peaked wave form in phase.

7. In combination, a source of periodic current, an electric discharge path having a control electrode and a plurality of principal electrodes and a gaseous medium connected to be energized from said source, means for periodically impressing a potential smaller than the critical potential between said control electrode and a principal electrode of said discharge path, said potential persisting during each period during which it is impressed at least for a time interval comparable to a half period of said source, means for superimposing on said impressed potential a potential of peaked wave form during each period of said source, said potential of peaked wave form having an amplitude less than said critical potential and the sum of said potential of peaked wave form and said impressed potential being greater than said critical control potential, and means for superimposing on the last-said potentials another potential of peaked-wave form during each period of said source, said last-named potential of peaked wave form being greater than said critical control potential, both said potentials of peaked wave form persisting for a time interval that is short compared to a period of said source, said first-named and said last-named superimposing means including means for adjusting the phases of said peaked potentials relative to said source and said adjusting means being so set that said first-named peaked potential leads said last-named peaked potential.

8. Apparatus for supplying energy from an alternating current source to a welding load comprising a pair of electric discharge paths connected in anti-parallel between said source and said load, each of said paths having a plurality of principal electrodes and a control electrode and a gaseous medium, means for controlling the heating energy supplied to said load during the welding intervals, the last-said means including means for impressing a potential of magnitude less than the critical control potential of said discharge paths between the control electrode and one of the principal electrodes of each of said discharge paths and means for superimposing a potential of peaked wave form but of maximum magnitude less than said critical control potential on said impressed potential, during each of the half cycles of said welding intervals and at predetermined points in said half-cycles, the sum of the magnitude of said impressed potential and the maximum magnitude of the peaked potential being greater than said critical control potential and means for controlling the energy supplied to said load during the intervals intervening between welding intervals, the last-said means including means for impressing between said control electrodes and said principal electrodes of said discharge paths, during each of the half cycles of the said intervening intervals and at predetermined points in said half cycles, potentials of peaked wave form and of maximum magnitude greater than said critical control potential.

9. Apparatus for supplying energy from an alternating current source to a welding load comprising a pair of electric discharge paths connected in anti-parallel between said source and said load, each of said paths having a plurality of principal electrodes and a control electrode and a gaseous medium, means for controlling the heating energy supplied to said load during the welding intervals, the last-said means including means for impressing a potential of magnitude less than the critical control potential of said discharge paths between the control electrode and one of the principal electrodes of each of said discharge paths and means for superimposing a potential of peaked wave form but of maximum magnitude less than said critical control potential on said impressed potential, during each of the half cycles of said welding intervals and at predetermined points in said half-cycles, the sum of the magnitude of said impressed potential and the maximum magnitude of the peaked potential being greater than said critical control potential and means for controlling the energy supplied to said load during the intervals intervening between welding intervals, the last-said means including means for impressing between said control electrodes and said principal electrodes of said discharge paths, during each of the half cycles of the said intervening intervals and at predetermined points in said half cycles, potentials of peaked wave form and of maximum magnitude greater than said critical control potential, the last-said peaked potentials being impressed later in the half-cycles of said source than the first-said peaked potentials.

10. Apparatus for supplying from a source to a load a series of discrete current pulsations of predetermined magnitude with current pulsations of substantially smaller magnitude interposed between the first-named pulsations, comprising grid-controlled arc-like electric discharge means interposed between said source and said load for controlling the flow of current from said source to said load and means for supplying control potential to said discharge means, said control potential being made up of a plurality of components and means for regulating each component for itself said regulating means being so set that the timing of the larger magnitude and smaller magnitude current pulsations is maintained and the regulating means of certain of said components including means providing for the continuous regulation of said components thereby to provide for the continuous regulation of the magnitudes of said current pulsations independently of each other.

11. Apparatus for supplying energy from a source of periodically pulsating current to a load comprising gaseous electric discharge means, having a plurality of principal electrodes and control means for the discharge between said principal electrodes, in circuit with said source and said load, means for impressing a potential less than the critical potential of said discharge path on said control means during the number of successive pulsations of said source that current is to flow through said load, said potential being impressed intermittently, a number of successive pulsations of said source, during which current is not to flow through said load, intervening between successive impressions of said potential, means for superimposing on said impressed potential during each pulsation of said source, a potential of peaked wave form, the sum of the amplitude of the potential of peaked wave form and the amplitude of the said impressed potential being greater than said critical potential, and means for superimposing on the last said potentials during each pulsation of said source another potential of peaked wave form, the amplitude of which is greater than the said critical potential.

12. Apparatus for supplying energy from a source of periodically pulsating current to a load comprising gaseous electric discharge means, having a plurality of principal electrodes and control means for the discharge between said principal electrodes, in circuit with said source and said load, means for impressing a potential less than the critical potential of said discharge path on said control means during the number of successive pulsations of said source that current is to flow through said load, said potential being impressed intermittently, a number of successive pulsations of said source, during which current is not to flow through said load, intervening between successive impressions of said potential, means for superimposing on said impressed potential during each pulsation of said source, a potential of peaked wave form, the amplitude of said potential of peaked wave form also being smaller than said critical potential and the sum of the amplitude of the potential of peaked wave form and the amplitude of the said impressed potential being greater than said critical potential, and means for superimposing on the last said potentials during each pulsation of said source another potential of peaked wave form the amplitude of which is greater than the said critical potential.

RICHARD SCHNARZ.